D. DUNWOODIE.
AUTOMATIC TEMPERATURE REGULATING DEVICE.
APPLICATION FILED FEB. 4, 1916.

1,244,184.

Patented Oct. 23, 1917.

INVENTOR.
BY David Dunwoodie.
Edward L. Reed
ATTORNEY.

__UNITED STATES PATENT OFFICE.__

DAVID DUNWOODIE, OF DAYTON, OHIO.

AUTOMATIC TEMPERATURE-REGULATING DEVICE.

1,244,184.  Specification of Letters Patent.  Patented Oct. 23, 1917.

Application filed February 4, 1916. Serial No. 76,110.

*To all whom it may concern:*

Be it known that I, DAVID DUNWOODIE, a subject of the King of Great Britain, residing at Dayton, in the county of Montgomery and State of Ohio, have invented certain new and useful Improvements in Automatic Temperature - Regulating Devices, of which the following is a specification, reference being had therein to the accompanying drawing.

This invention relates to automatic temperature regulating devices and is designed more particularly for regulating the temperature of water delivered to a faucet. The object of the invention is to provide a device which will so regulate the mixing of hot and cold water as to maintain the mixture, which is delivered at the faucet, at a uniform temperature, and to provide such a device with means whereby the temperature of the water delivered to the faucet can be varied. It is also an object of the invention to provide a device of this kind which will be very simple in construction, positive in its operation and which can be manufactured and installed at a relatively low cost.

Figure 1:
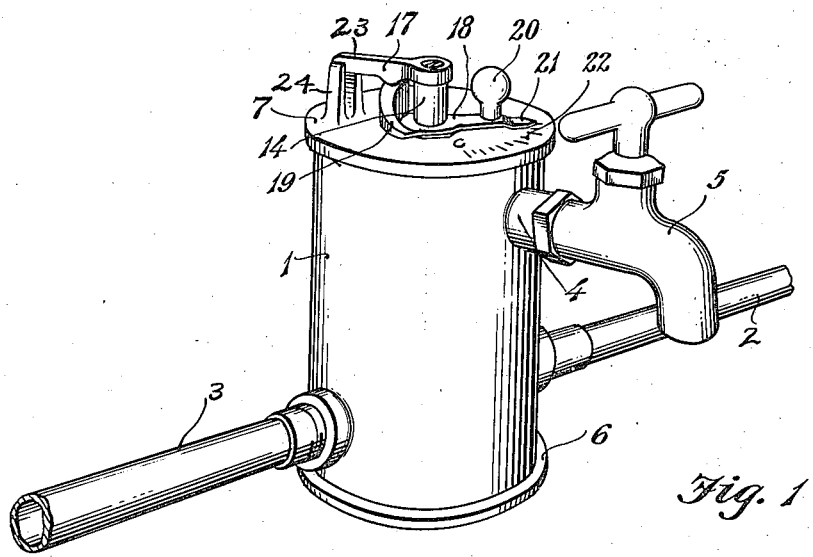
Figure 2:
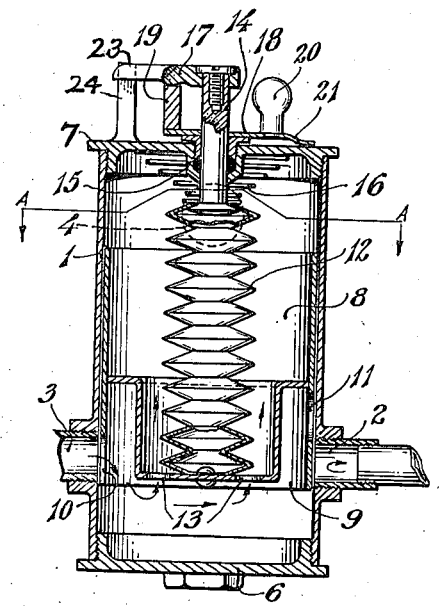
Figure 3:
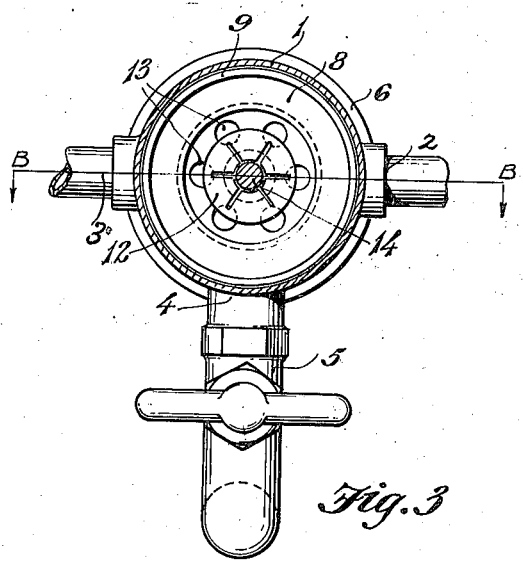

In the accompanying drawings Figure 1 is a perspective view of a device embodying my invention; Fig. 2 is a sectional view taken vertically through such a device; and Fig. 3 is a section taken on the line A—A of Fig. 2.

In these drawings I have illustrated the invention as embodied in a device designed for regulating the temperature of water as it is delivered to a faucet, but it will be understood that this particular embodiment of the invention is used for the purpose of illustration only and that the device can be used for regulating the temperature of various fluids and that it is not essential that the fluid be delivered to a faucet.

In that particular embodiment of the invention here shown the device comprises a receptacle 1 having separate inlets, 2 and 3, for cold and hot water. The casing is also provided, preferably at a point remote from the inlets 2 and 3, with an outlet 4, which is here shown as communicating with a faucet 5. The casing 1 is here shown as cylindrical in form, but it will be obvious that it may be of any suitable character which will permit a thorough intermingling of the water from the two inlets. Preferably the inlets are spaced away from the bottom of the receptacle to permit any foreign matter or sediment which may enter with the water to be deposited in the lower part of the receptacle where it will not in any way interfere with the operation of the device. To permit access to be had to the interior of the receptacle, either to remove the foreign matter or for any other purpose, the lower end of the receptacle is closed by a removable head 6, which is here shown as a cap screw-threaded into the lower end of the cylindrical body of the receptacle. The upper end of the body of the receptacle is likewise closed by a removable head 7.

Mounted within the receptacle is suitable mechanism for regulating the flow of the hot and cold water to the respective inlets, 3 and 2. This mechanism may take various forms, but I have here shown it as comprising a single cylindrical valve member 8 slidably mounted within the cylindrical body of the receptacle 1 and having portions, 9 and 10, to control the flow of water through the inlets 2 and 3. The part 10 of the cylindrical valve member is in the form of an extension to the body thereof and is arranged to be moved into and out of alinement with the inlet opening 3 by the vertical reciprocatory movement of the valve member. It is so arranged that when the valve member is near its uppermost position it will be out of alinement with the inlet 3 and the flow of hot water to the receptacle 1 will be unrestricted. The downward movement of the valve member will move the part 10 thereof across the inlet 3 and restrict the flow of the hot water in proportion to the amount of downward movement which has been imparted to the valve member. The part 9 of the valve member which controls the flow of cold water through the inlet 2, is likewise in the form of an extension depending from the body of the valve member, but it differs from the part 10 in that it is provided with a port 11 which is adapted to be moved into and out of alinement with the inlet port 2.

The port 11 is so arranged that it will be in alinement with the inlet port 2 when the valve member is near its lowermost position and the flow of cold water through the inlet 2 will be unrestricted. The port 11 is spaced some distance above the lower edge of the part 9 of the valve, and when the valve is moved into its uppermost position, that portion thereof, lying beneath the port 11, will have been moved into alinement with the inlet 2 and will completely close this inlet. Hence it will be apparent that when the valve is in its uppermost position the hot water inlet will be open and the cold water inlet will be closed, and when the valve is in its lowermost position the cold water inlet will be open and the hot water inlet will be closed. By adjusting the position of the valve with relation to the inlet ports the flow of hot and cold water can be so regulated that the mixture will be of the desired temperature.

I have mounted within the receptacle 1 means for automatically adjusting the valve member 9 to regulate the flow of hot and cold water to the receptacle. This adjusting means is preferably in the form of a thermostat 12. Thermostatic devices of various kinds may be utilized for this purpose. That here shown is of a highly efficient character and comprises a series of disk-like receptacles arranged in axial alinement and connected one to the other. These receptacles may, if desired, contain a fluid which is highly sensitive to variations in temperature and will therefore expand or contract quickly upon any variation of temperature of the water surrounding the same. The thermostat 12 is connected at its lower end with the valve member, this connection being preferably formed by an apertured plate, or spider, 13, to the center of which the thermostat is secured. The upper end of the thermostat is held normally against movement so that the expansion and contraction of the thermostat will cause reciprocatory movement to be imparted to the valve member. By properly adjusting the thermostat and the valve member 8 with relation to the inlets, 2 and 3, the temperature of the water which is delivered to the faucet may be maintained at any desired degree between the temperature of the cold water and the temperature of the hot water, as delivered to the respective inlets. The device having been set to deliver water at a given temperature to the faucet it will be apparent that an increase in the temperature of the hot water delivered to the receptacle will result in an expansion of the thermostat and the downward movement of the valve member, thus further restricting the flow of hot water and increasing the flow of cold water.

When the temperature of the hot water is again normal there will be a corresponding contraction of the thermostat and elevation of the valve member to restore the flow of water to the two inlets to the former proportions. Likewise, a decrease in the temperature of the hot water, or any variation in the temperature of the cold water, will result in a corresponding movement of the valve.

It is desirable however, that the device should be readily adjustable to permit the temperature of the water delivered to the faucet to be varied, and I have provided the device with means for accomplishing this result from the exterior of the casing. To this end I have connected the upper end of the thermostat with the head 7 of the receptacle through the medium of a rod 14 which is slidably mounted in a stuffing box 15 mounted in the head 7. A spring 16 is coiled about the rod 14 and confined between the stuffing box and the thermostat to restrict the forward movement of the latter and cause its expansion and contraction to actuate the valve member. The end of the rod 14 extends beyond the head 7 of the receptacle, and I have applied to this projecting end of the rod means for adjusting its position with relation to the head 7 and thus raising or lowering the thermostat and the valve member and varying the position of the latter relatively to the inlet openings. The adjustment may be secured in various ways, but I have here shown the rod 14 as provided with a head 17 which is spaced away from the head 7 of the receptacle 1, and I have mounted on the head of the receptacle a pivoted lever 18 having a cam shaped portion 19 arranged to engage the under side of the head 17 of the rod and adapted to elevate the head against the tension of the spring when the lever 18 is moved in one direction and to permit the spring to move the rod downward when the lever is moved in the other direction. The lever 18 is provided with an actuating handle 20 and a pointer 21 which travels over a scale 22 which indicates the temperature of the water delivered at the faucet. To hold the slide rod 14 against rotation, I have provided the head 17 of the rod with a finger 23 which travels in a guideway formed between two upright members 24, mounted upon the head of the receptacle.

Under certain conditions of use the adjusting device could be arranged within the receptacle, but for ordinary use I prefer to arrange the actuating device and cam on the exterior of the receptacle, as here shown. When there is no material difference between the pressures at which the streams of hot and cold water are delivered to the receptacle the streams may be of the same volume, but when one stream is delivered at a pressure materially greater than the pressure of the other stream its volume is preferably reduced, and in the present instance, I have shown the cold water supply pipe as reduced in diameter. This reduction is here shown as accomplished by a screw plug arranged at a point removed from the receptacle so that the inlet opening for the cold water is of the same size as the inlet opening for the hot water.

The operation of the device will be readily understood from the foregoing description and it will be apparent that I have produced a regulating device of this kind which is very simple in its construction and highly efficient in its operation.

While I have shown and described one embodiment of my invention I wish it to be understood that I do not wish to be limited to the details of construction shown and described as obvious modifications will occur to a person skilled in the art. For example, it will be obvious that the regulation of the flow of water through the two inlets consists in varying the proportionate quantities of water flowing through the inlets, and this regulation can be accomplished, within certain limitations, by increasing or decreasing the flow of water through one of the inlets without altering the flow through the other inlet.

Having now fully described my invention, what I claim as new, and desire to secure by Letters Patent is:—

1. In a device of the character described, a casing having near one end thereof separate inlets for hot and cold water and having near the other end thereof an outlet, a hollow cylindrical valve mounted in said casing for movement lengthwise thereof and having parts to alternately close the respective inlets, a partition arranged within said valve between said parts thereof and said outlet and having openings therein, and a thermostat connected at one end with said partition and at the other end with said casing adjacent to said outlet, and adapted to shift said valve to regulate said inlets according to the temperature of the water in said casing on that side of said partition adjacent to said outlet.

2. In a device of the character described, a casing comprising a cylindrical body portion closed at its ends by cylinder heads, said body portion having near its lower end separate inlets for hot and cold water and having an outlet near its upper end, a hollow cylindrical valve member slidably mounted within said casing for movement longitudinally thereof, and having near its lower end parts adapted to be moved alternately into alinement with the respective inlets to control the flow of water through the same, a partition mounted within said valve member, between said inlets and said outlet, secured at its edges to the wall thereof, having openings therethrough and having a central depressed portion and a thermostat mounted in said valve member, having one end extending into the depressed portion of said partition, and having its other end secured to the upper cylinder head, whereby said thermostat will shift said valve member to regulate the flow of water through the inlets according to the temperature of the water above said partition.

3. In a device of the character described, a receptacle having separate inlets for hot and cold water and having an outlet, a valve member mounted in said receptacle for movement longitudinally thereof and having parts arranged to control the flow of water through the respective inlets, a thermostat mounted within said receptacle and connected with said valve member to impart longitudinal movement thereto, a rod connected with said thermostat to support the same and said valve member within said receptacle, said rod extending through the wall of said receptacle, a head secured to the outer end of said rod, a cam mounted on said receptacle and arranged to engage said head, and means for actuating said cam.

4. In a device of the character described, a receptacle having separate inlets for hot and cold water and having an outlet, a valve member mounted in said receptacle for movement longitudinally thereof and having parts to control the flow of water through the respective inlets, a thermostat mounted within said receptacle and connected with said valve member to impart longitudinal movement thereto, a rod connected with said thermostat and connected at one end with said receptacle, a spring interposed between said thermostat and the end of said receptacle, a head secured to the outer end of said rod, a cam mounted on the end of said receptacle in operative engagement with the head of said rod, and means to actuate said cam to cause the adjustment of said rod and the parts connected therewith.

5. In a device of the character described, a cylindrical receptacle having separate inlets near the lower end thereof, a cylindrical valve member mounted within said receptacle for movement longitudinally thereof and having parts to control the flow of water through the respective inlets, a thermostat connected with said valve member, a rod secured to said thermostat and extending through the end of said receptacle, a spring coiled about said rod between the end of said receptacle and said thermostat, said rod extending through the end of said receptacle, a head secured to the outer end of said rod, a lever pivotally mounted on the end of said receptacle, a cam carried by said lever to engage the head of said rod and control the position thereof, and a scale on the end of said receptacle adjacent to the end of said lever to indicate the adjustment of the controlling devices.

In testimony whereof, I affix my signature hereto.

DAVID DUNWOODIE.